INVENTORS
HARRY D. KIEFABER
RAY S. TAYLOR

BY Ernest J. Hy

THEIR ATTORNEY

United States Patent Office 3,250,067
Patented May 10, 1966

3,250,067
FLUID APPARATUS
Harry D. Kiefaber, Beavercreek Township, Ohio, and Ray S. Taylor, Cincinnati, Ohio, assignors to The Sheffield Corporation, Dayton, Ohio, a corporation of Delaware
Filed Nov. 23, 1964, Ser. No. 412,897
12 Claims. (Cl. 60—6)

This invention pertains to fluid devices and more particularly to a fluid device for maintaining a predetermined displacement from a given surface.

One object of this invention is the provision of a fluid device for maintaining a precise displacement between relatively movable members without physical contact between such members and which is economical to manufacture, and efficient and troublefree in operation.

Another object of this invention is to provide such a device wherein fluid jet means maintain a given spacing, without contact, between two members along a line of relative displacement during relative movement of said members transverse said line of displacement.

Another object of this invention is the provision of a device for maintaining a first member at a controlled displacement from a second member by yieldingly urging said first member with a constant force toward said second member while employing the reactive force of fluid jet means acting between said first and second members to counterbalance said constant force to thereby precisely control the displacement between said members.

Another object of this invention is the provision of a device for transferring an electrical signal between two stationary or relatively movable members while employing fluid jet means to precisely maintain said members in a known spaced relation from each other thereby assuring that such signal will not vary.

Figure 1:
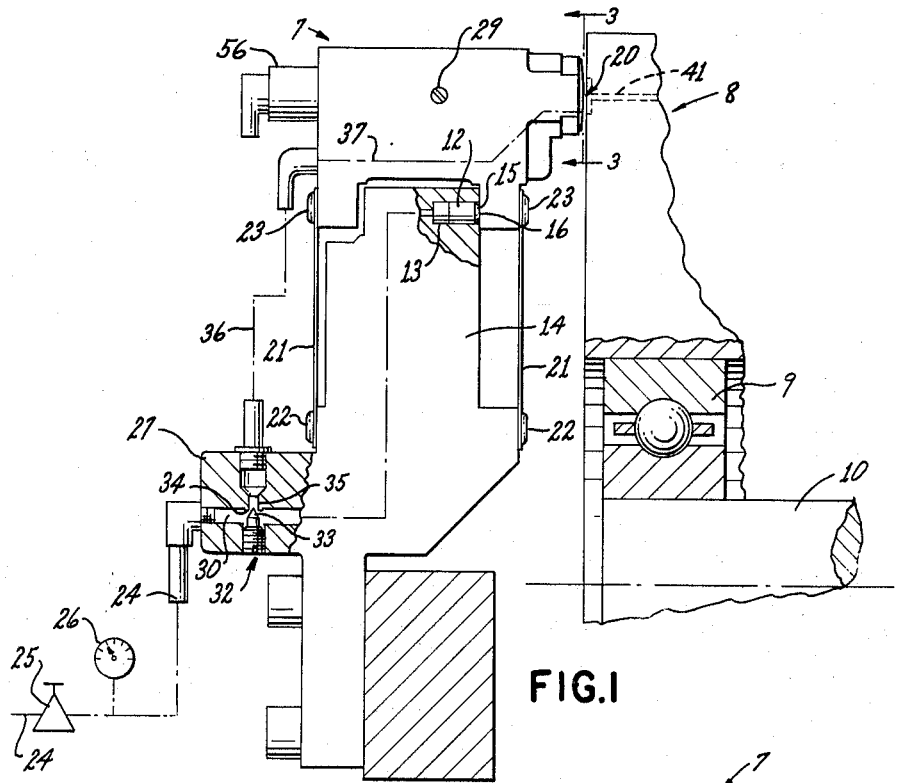
Figure 2:
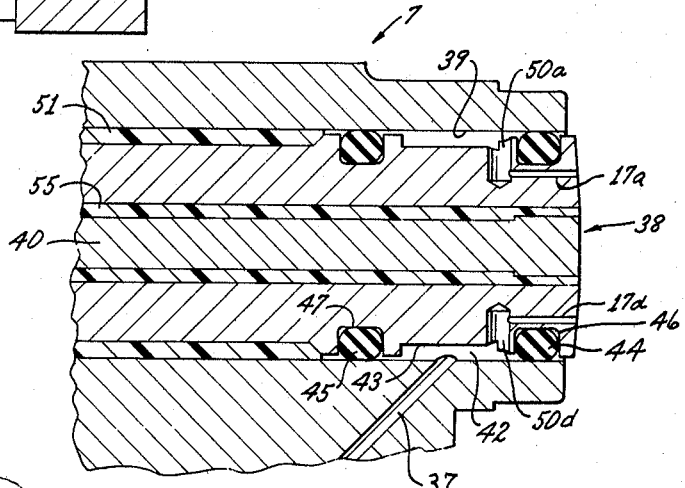
Figure 3:
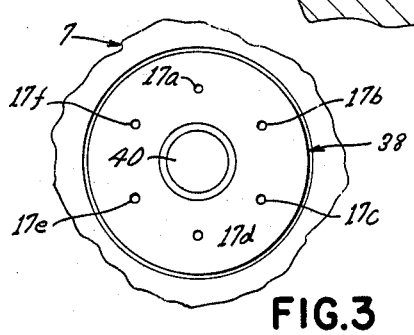

Other objects and advantages of the invention will be apparent from the following description, the appended claims, and the accompanying drawing, in which, FIG. 1 illustrates an exemplary embodiment of the invention with portions shown in section and portions broken away, FIG. 2 is a fragmentary sectional view taken vertically through the upper portion of the unit of FIG. 1, and FIG. 3 is a view on the line 3—3 of FIG. 1.

An exemplary embodiment of this invention is illustrated in FIG. 1 for maintaining a first member or fluid discharging head 7 a predetermined precise displacement from a second member or rotatable disc 8 without physical contact therebetween. Disc 8 is mounted for rotation on a bearing 9 supported on a shaft 10.

Means yieldingly urging said first member or head 7 relatively toward disc 8 includes fluid actuated means illustrated as a fluid actuated piston 12 employing air as the operating medium and carried for movement toward and away from disc 8 in a cooperating bore 13 in a support housing 14 which carries head 7. Piston 12 is retained for limited movement within such bore 13 and toward disc 8 and has a surface contacting probe portion 15 which engages a surface 16 on head 7 and yieldingly urges such head toward disc 8. It will be apparent that with the application of constant fluid pressure against piston 12, the force exerted thereby will be constant throughout the full range of movement of such piston.

The force exerted by the yielding means is opposed by fluid jet means including fluid jets 17a–f in head 7 and particularly illustrated in FIG. 3. Fluid jets 17 are individually balanced such that each such jet provides the proper amount of flow therethrough. Jets 17 exert a reactive force between head 7 and disc 8 in the area generally illustrated at 20. The force exerted by jet 17 opposes the force exerted by the yielding means or piston 12 such that the displacement between head 7 and disc 8 is determined by the reactive force exerted by fluid jets 17.

Head 7 is supported for movement relative to disc 8 and in this example head 7 is supported for movement generally toward and away from such disc. Means carrying head 7 in an upright manner on support 14 for movement relative to disc 8 includes elongated flexible means such as steel rods or strips 21 each having one end fastened to support 14 by screws 22 and the opposite end fastened to head 7 by screws 23 to thereby carry such head for movement relative to disc 8 in a frictionless manner. To prevent damage of head 7 in the event of fluid system failure steel strips 21 preferably bias head 7 away from disc 8. This may be achieved by construction of the steel strips or by fastening and arranging such steel strips at a slight angle with respect to the vertical.

Common fluid supply means is provided for fluid piston 12 as well as for the fluid jets 17a–f. Such common fluid supply is provided through a line 24 having an adjustable pressure regulator 25 installed therein. A pressure gage 26 is provided in such line to present a visual display of the regulated fluid pressure. Line 24 is connected to a housing extension 27 of support 14 and regulated fluid or air passes therethrough and through a passage 30 in housing 27 to the air actuated piston 12. It will be apparent that the force exerted by such piston is readily set by proper adjustment of pressure regulator 25. Flow from passage 30 is also supplied to the fluid jets 17a–f. It will be appreciated that the utilization of a common regulated supply to fluid jets 17 and the air actuated piston 12 insure constant displacement between head 7 and disc 8 irrespective of minor variations in the regulated output pressure.

Means adjusting flow to such fluid jets or air jets 17 is provided to thereby control the reactive force exerted between head 7 and disc 8 and thereby determine the displacement therebetween and includes an adjustable valve 32 suitably installed in housing 27. Valve 32 includes conical plunger element 33 which may be threadedly adjusted relative to a cooperating seat 34 in housing 27. Air flow from such valve is conveyed through another passage 35 in housing 27 to a readily flexible conduit 36 and in turn to a passage 37 in head 7. Flexible conduit 36 assures that head 7 is free to move toward and away from disc 8 in an unobstructed manner.

As illustrated particularly in FIG. 2, floating head 7 also carries removable member 38 fixed in a cylindrical bore 39 in head 7 by set screw 29 and as an integral part thereof. Member 38 includes fluid orifice means or jets 17 for directing fluid toward said second member or disc 8.

Air flow from passage 37 is conveyed to an annular passage 42 in head 7 which, with member 38 mounted in such head, is defined by a groove 43 in member 38, sealing O rings 44 and 45 mounted in grooves 46 and 47 respectively in member 38, and the wall portion of cylindrical bore 39 between said O rings.

A plurality of cross drilled passages 50a–f (only 50a and 50d are visible in the drawing) are provided in member 38 and communicate with annular passage 42. Air jets 17a–f arranged transverse to corresponding passages 50a–f respectively communicate therewith. Air jets 17 in discharge head 7 are arranged in this example as particularly illustrated in FIG. 3.

The fluid discharge head 7 has a substantially conical outer surface through which jets 17 discharge air and such jets are symmetrically arranged therein. It will be apparent that with angular deviations of the opposing planar surface on disc 8 caused, for example, by wear of bearing 9 or mis-alignment during rotation thereof, the effective displacement between head 7 and disc 8 will not be adversely effected and will be kept substantially constant. This is achieved because if disc 8 were to be skewed at a slight angle several fluid jets in the fluid discharge head would always be directed essentially normally against disc 8 thus assuring that a maximum number of such jets are brought into effective action.

In this example member 38 carries electrical means for transferring an electrical signal such as an electrical capacitive signal between head 7 and disc 8 through the constant displacement therebetween maintained by fluid jets 17. Such electrical means includes conductive element 40 which is brought into cooperating relationship with an electrical element or commutator bar 41 fixed to disc 8 in this example. As disc 8 rotates into a position opposite element 40 an electrical signal is transmitted between element 40 and bar 41 without contact therebetween and uneffected by variations in the plane of the disc and constant spacing is maintained.

Member 38 includes electrical insulation, as illustrated at 51, where it comes into contact with cooperating bore 39 in the housing portion of head 7. Electrical insulation is provided at 55 to electrically insulate conductor 40 and such conductor is connected to an electrical connector illustrated at 56 and through which an electrical signal from element 40 is transmitted to a suitable utilization point.

Thus it will be seen that a device is provided in which a first member is maintained at a controlled displacement from a second member without physical contact therebetween and during relative movement of the members transverse the direction of controlled displacement. Means are provided to yieldingly urge said first member toward the second with a controlled constant force while employing the reactive force exerted by fluid jet means acting between the members to oppose said force by an amount determined by such jet means to thereby precisely control the displacement between said first and second members. Further features of the circuitry and general arrangement insure accurate spacing and optimum performance.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A device for maintaining a first member a predetermined displacement from a second member without physical contact therebetween comprising,
    a first member,
    means supporting said first member for movement relative to said second member along an axis intersecting the opposing surface of said second member,
    means yieldingly urging said first member relatively toward said second member and relative to said supporting means along said axis with a constant force,
    and fluid jet means exerting a reactive force between said first and second members counteracting the force of said yielding means such that the displacement between said members is determined by the reactive force exerted by said fluid jet means.

2. A device for maintaining a first member a predetermined displacement from a second member without physical contact therebetween comprising,
    a first member supported for movement relative to said second member,
    air pressure means yieldingly urging said first member relatively toward said second member with a constant force,
    and adjustable air jet means exerting a reactive force between said first and second members counteracting the force of said yielding means such that the displacement between said members is determined by the reactive force exerted by said air jet means.

3. A device for maintaining a first member a predetermined displacement from a second member without physical contact therebetween comprising,
    a first member supported for movement relative to said second member,
    common fluid supply means,
    fluid actuated means operatively connected to said common supply means yieldingly urging said first member relatively toward said second member with constant force,
    and fluid jet means operatively connected to said common supply means exerting a reactive force between said first and second members counteracting the force of said fluid actuated means such that the displacement between said members is determined by the reactive force exerted by said fluid jet means.

4. A device for maintaining a first member a predetermined displacement from a second member without physical contact therebetween comprising,
    a first member supported for movement relative to said second member,
    common air supply means,
    air pressure means operatively connected to said common supply means yieldingly urging said first member relatively toward said second member with constant force,
    and air jet means operatively connected to said common supply means exerting a reactive force between said first and second members counteracting the force of said air pressure means such that the displacement between said members is determined by the reactive force exerted by said air jet means.

5. A device for maintaining a first member a predetermined displacement from a second member during relative movement between such members and without physical contact therebetween comprising,
    a first member supported for movement relative to said second member,
    common air supply means,
    air actuated piston means operatively connected to said common supply means yieldingly urging said first member relatively toward said second member with constant force,
    air jet means operatively connected to said common supply means exerting a reactive force between said first and second members counteracting the force of said piston means,
    and means adjusting air flow to said air jet means to control the reactive force exerted between said members to thereby determine the displacement between said members.

6. A device for maintaining a first member a predetermined displacement from a second member without physical contact therebetween comprising,
    a first elongated member,
    a support,
    means carrying said first member on said support for axial movement relative to said second member and said support,
    means urging first member toward said second member,
    fluid orifice means at the end of said first member adjacent said second member arranged to direct fluid toward said second member,
    and fluid supply means operatively connected to provide flow through said fluid orifice means and thus provide a reactive force between said first and second members counteracting the force exerted by said urging means such that the displacement between said members is determined by the reactive force exerted by the fluid ejecting between said first and second members.

7. A fluid device for maintaining a precise displacement between a first and a second relatively movable member without physical contact therebetween comprising,
- a first member,
- a support,
- means carrying said first member on said support for movement relative to said second member,
- means urging said first member toward said second member,
- fluid orifice means in said first member arranged to direct fluid toward said second member,
- fluid supply means operatively connected to provide flow through said fluid orifice means and thus provide a reactive force between said first and second members counteracting the force exerted by said urging means such that the displacement between said members is determined by the reactive force exerted by the fluid ejecting between said first and second members,
- and electrical means carried by said first member for transferring an electrical signal between said first and second members through said constant displacement and thereby assure that an effective signal level is maintained.

8. A device for maintaining a first member a predetermined displacement from a second member without physical contact therebetween comprising,
- a first member,
- means supporting said first member for movement relative to said second member along an axis intersecting the opposing surface of said second member,
- means urging said first member relatively toward said second member and relative to said supporting means along said axis with a constant force,
- fluid orifice means in said first member including a fluid discharge head having a plurality of fluid jets therein, and carried by said first member and arranged to cooperate with an opposing surface on said second member,
- and fluid supply means operatively connected to provide flow through said fluid jets in said fluid discharge head and thus provide a reactive force between said first and second members counteracting the force exerted by said urging means such that the displacement between said members is determined by the reactive force exerted by the fluid ejecting between said first and second members.

9. A device for maintaining a first member a predetermined displacement from a second member without physical contact therebetween comprising,
- a first member,
- a support,
- means carrying said first member on said support for movement relative to said second member,
- means urging said first member toward said second member,
- fluid orifice means in said first member including a fluid discharge head having a plurality of fluid jets therein, and carried by said first member and arranged to cooperate with an opposing surface on said second member,
- said fluid discharge head having substantially conical outer surface and said jets in said fluid discharge head being symmetrically arranged therein such that with angular deviations of said opposing surface with respect to said head the effective displacement between said first and second members will be constant,
- and fluid supply means operatively connected to provide flow through said fluid jets in said fluid discharge head and thus provide a reactive force between said first and second members counteracting the force exerted by said urging means such that the displacement between said members is determined by the reactive force exerted by the fluid ejecting between said first and second members.

10. A fluid device for maintaining a first member a predetermined displacement from a second member without physical contact therebetween,
- a first elongated member,
- a support,
- elongated flexible means having one end fastened to said support and the opposite end fastened to the first member to thereby carry said first member for axial movement relative to said second member and said support in a frictionless manner,
- means urging said first member toward said second member,
- fluid orifice means at the end of said first member adjacent said second member arranged to direct fluid toward said second member,
- and fluid supply means operatively connected to provide flow through said fluid orifice means and thus provide a reactive force between said first and second members counteracting the force exerted by said urging means such that the displacement between said members is determined by the reactive force exerted by the fluid ejecting between said first and second members.

11. A fluid device for maintaining a precise displacement between a first and a second member which is movable with respect to said first member without physical contact therebetween comprising,
- a first member,
- a support,
- elongated flexible means normally biasing said first member away from said second member including a plurality of flexible metallic elements each having one of its ends fastened to said support and each having its opposite end fastened to the first member carrying said first member for movement relative to said second member,
- common air supply means,
- air actuated means operatively connected to said common supply means yieldingly urging said first member toward said second member with a constant force of greater magnitude than the force imposed by said biasing means,
- air jet means operatively connected to said common supply means exerting a reactive force between said first and said second members counteracting the force of said air actuating means such that with an air supply failure said bias force will displace and maintain said first member away from said moving second member,
- and means adjusting air flow to said air jet means to control the reactive force exerted between said members to thereby control the displacement between said members.

12. A fluid device as set forth in claim 11 further comprising,
- electrical means carried by said first member for transferring an electrical capacitive signal between said first and second members and through said constant displacement and thereby assure that such signal is maintained at a constant level.

References Cited by the Examiner

UNITED STATES PATENTS 3,108,259 10/1963 Perkins et al. _____ 308—9 X
3,152,845 10/1964 Ertaud et al. _____ 308—9

EDGAR W. GEOGHEGAN, *Primary Examiner.*